(12) United States Patent
Sundaresan et al.

(10) Patent No.: US 9,396,015 B2
(45) Date of Patent: Jul. 19, 2016

(54) FLEXIBLE DEVICE TEMPLATES FOR CONNECTED CONSUMER DEVICES

(71) Applicant: Ayla Networks, Inc., Sunnyvale, CA (US)

(72) Inventors: Sudha Sundaresan, San Jose, CA (US); Vishwesh Pai, Milpitas, CA (US); Adrian Caceres, Los Gatos, CA (US)

(73) Assignee: Ayla Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/525,098

(22) Filed: Oct. 27, 2014

(65) Prior Publication Data

US 2016/0117184 A1   Apr. 28, 2016

(51) Int. Cl.
*G06F 9/44* (2006.01)
*G06F 9/455* (2006.01)
*G06F 9/445* (2006.01)

(52) U.S. Cl.
CPC .............. *G06F 9/45558* (2013.01); *G06F 8/20* (2013.01); *G06F 8/71* (2013.01); *G06F 9/44505* (2013.01); *G06F 2009/45562* (2013.01)

(58) Field of Classification Search
CPC .......... G06F 8/71; G06F 9/44505; G06F 8/20
See application file for complete search history.

(56) References Cited

U.S. PATENT DOCUMENTS

| | | | |
|---|---|---|---|
| 2006/0212924 A1* | 9/2006 | Xie et al. | 726/1 |
| 2008/0059944 A1* | 3/2008 | Patterson | G06F 8/10 717/104 |
| 2011/0102443 A1 | 5/2011 | Dror et al. | |
| 2011/0107329 A1 | 5/2011 | Betzler et al. | |
| 2011/0246835 A1* | 10/2011 | Hasegawa et al. | 714/39 |
| 2012/0124187 A1* | 5/2012 | Onda | G06F 8/61 709/223 |
| 2013/0031225 A1* | 1/2013 | Evans | 709/221 |
| 2014/0223512 A1* | 8/2014 | Hagiwara et al. | 726/4 |
| 2014/0337892 A1* | 11/2014 | Phang | G06F 3/04817 725/52 |
| 2015/0067805 A1* | 3/2015 | Martin | G06F 9/45558 726/7 |
| 2015/0095880 A1* | 4/2015 | Lee | G06F 8/30 717/108 |
| 2015/0227722 A1* | 8/2015 | Cholas | 717/121 |
| 2015/0268936 A1* | 9/2015 | Huber | G06F 8/20 717/108 |
| 2015/0281337 A1* | 10/2015 | Samson | H04L 67/10 709/201 |
| 2015/0334161 A1* | 11/2015 | Bullotta | G06F 9/4443 709/201 |
| 2015/0365480 A1* | 12/2015 | Soto | H04L 12/2827 709/224 |
| 2015/0381737 A1* | 12/2015 | Quinn | G06F 17/30575 709/217 |

OTHER PUBLICATIONS

Gavrin et al., "Ultra Lightweight JavaScript Engine for Internet of Things", ACM, SPLASH Companion'15, Oct. 2015, pp. 19-20; <http://dl.acm.org/citation.cfm?id=2816270&CFID=761197476&CFTOKEN=35739991>.*

Perumal et al., "IoT Device Management Framework for Smart Home Scenarios", 2015 IEEE, Oct. 2015, pp. 54-55; <http://ieeexplore.ieee.org/stamp/stamp.jsp?tp=&arnumber=7398711>.*

(Continued)

*Primary Examiner* — Thuy Dao
*Assistant Examiner* — Ben C Wang
(74) *Attorney, Agent, or Firm* — Lowenstein Sandler LLP

(57) ABSTRACT

A processing device executing a registration service receives information identifying a first device, a second device and an application running on the first device. The processing device determines a registration technique that is supported by both the application and the second device and sends a message indicating the registration technique to at least one of the first device or the second device, wherein the application is to perform an operation associated with the first registration technique to bind the second device to the user account.

20 Claims, 9 Drawing Sheets

(56) References Cited

OTHER PUBLICATIONS

Yehui Liu, "Study on Smart Home System Based on Internet of Things Technology", Springer-Verlag, Dec. 2012, pp. 73-81; <http://link.springer.com/chapter/10.1007/978-1-4471-4793-0_9>.*

International Search Report and Written Opinion of the International Searching Authority for PCT Application No. PCT/US2015/047285 mailed Jan. 7, 2016.

* cited by examiner

FLEXIBLE DEVICE TEMPLATES FOR CONNECTED CONSUMER DEVICES

BACKGROUND

Many modern appliances, consumer devices, and other devices include embedded systems that are configured to perform one or more dedicated functions. However, most embedded systems of such devices do not include networking capabilities, role based access control capabilities, remote interface capabilities, remote control capabilities, or related capabilities. Designing such functionality into an embedded system, designing application programming interfaces (APIs) for accessing such functionality, designing web services capable of communicating with and controlling the embedded system via this added functionality, and designing applications for taking advantage of this functionality can consume considerable resources of the device manufacturer.

Moreover, most consumer devices follow a life-cycle in which the functionality of the consumer devices are defined, the consumer devices are developed, the consumer devices are manufactured, and finally the consumer devices are sold and deployed to customer locations. The behaviors of such consumer devices are typically hard coded into the consumer devices. Accordingly, the functionality and behaviors of the consumer devices cannot be modified after they have been deployed to a customer location. Additionally, the time frame for product development of conventional consumer devices can be very long (e.g., on the order of 6 months to a year in some instances).

BRIEF DESCRIPTION OF THE DRAWINGS

Reference will now be made to the accompanying drawings showing example embodiments of the present application, and in which.

DETAILED DESCRIPTION

Figure 1:
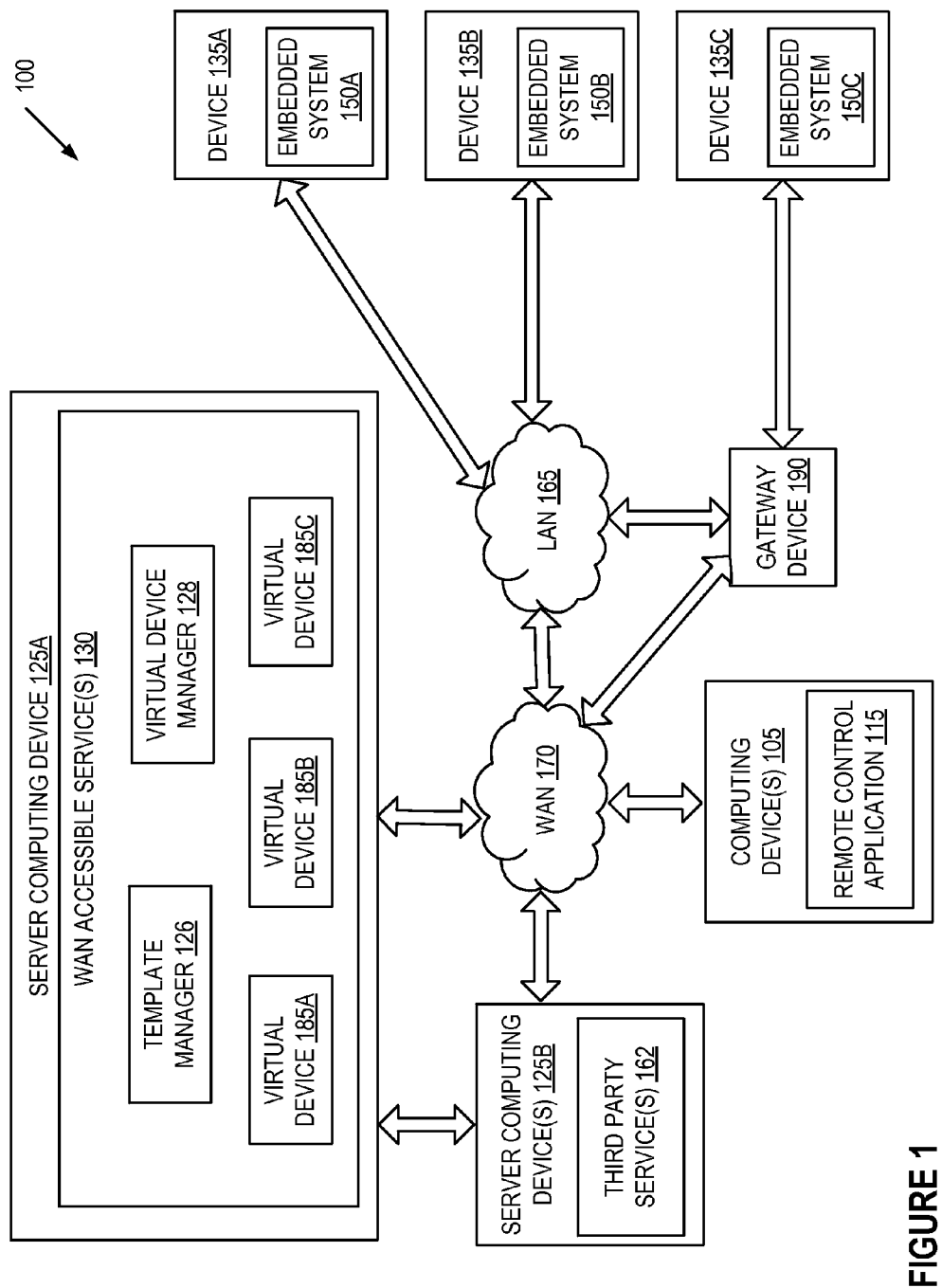
FIG. 1 is a block diagram depicting an example network architecture including remotely accessible devices and virtual devices for the remotely accessible devices.

Embodiments are directed to a network-connected device platform (also referred to as an internet-of-things (IoT) cloud platform or simply an IoT platform) having an agile templating framework that provides flexible generation and modification of virtual devices that can be used to facilitate, supplement and modify the functionality of physical devices. A connected device has many properties or attributes that can be controlled by a user and many properties or attributes that are used for monitoring and data collection purposes. The set of properties or attributes for a device varies based on the type of device, the model and the firmware it runs. These properties/attributes constitute the physical model of the device that is hardware and firmware dependent. In addition, the device has various behavioral characteristics that the OEM can define that are independent of hardware or firmware considerations. Some examples of these characteristics are alerts that are to be sent when certain device events happen, roles that have access to the device, and the method to be used for registering the device to a user account. These behaviors may be controlled by a cloud server and can vary at any point during the lifecycle of a device.

Some embodiments address the problems that arise when either the physical or behavioral attributes of a device change after the device has been deployed in the field. By adopting a flexible templating framework that can assign templates to devices based on changing requirements, the embodiments make the deployment of the changes seamless. The templating framework uses one or multiple device templates to define and generate virtual devices. Each template is a model of a device (or a component, feature or feature set of a device) that captures the physical and behavioral attributes of the device. The virtual devices may inherit the device attributes of each of the templates used to generate the virtual devices. These device attributes may include a superset of physical device attributes that are hard coded and/or manufactured into a physical device associated with a virtual device.

At any time one or more of the templates associated with a physical device may change. Additionally, new device templates may be associated with a physical device, or existing device templates may be disassociated with the device. After such a change in the associated device templates, a new virtual device may be created for a physical device. The new virtual device may then provide added functionality, attributes, behaviors, etc. for the physical device.

The agile templating framework enables the functionality, attributes and/or behaviors of a physical device to change over time. Such changes may occur even to physical devices that have been deployed to customer locations. In many instances, changes may be implemented based on updating business logic executed at a server (e.g., a cloud based server) without writing new software code for execution on the physical device or for execution on a server. This shortens and simplifies a product development cycle, and enables additional tools such as A-B testing between different versions of physical devices, where each version may have the same hardware and the same software but a different virtual device and business logic executed on a remote server. Additionally, templates may be used to quickly and easily define the functionality of a new product based on modifying and/or reusing device templates formerly created for other devices. This can further simplify product design and shorten the product development cycle.

In one embodiment, a virtual device manager determines one or more device templates associated with a physical device. Each of the device templates may define a particular set of device attributes (e.g., logical attributes, physical attributes, notification rules, business logic, etc.). The virtual device manager creates a virtual device from the one or more device templates. The virtual device may inherit sets of device attributes from the one or more device templates. Once the virtual device is created, the virtual device manager may establish a connection between the virtual device and the physical device over a network, and may then use the virtual device to control the physical device. At any time a new virtual device may be created for the physical device based on new and/or changed device templates, and may be used to control and/or interface with the physical device or Internet enabled device.

Referring now to the figures, FIG. 1 is a block diagram depicting an example network architecture 100 including remotely accessible devices 135A-C and computing devices 105, 125A, 125B that interact with the remotely accessible devices 135A-C. The network architecture 100 includes the multiple devices 135A-C connected to a local area network (LAN) 165. Thus, the devices 135A-C may be referred to as network-connected devices.

In one embodiment, the devices 135A-C are devices with embedded systems 150A-C, and may include, for example, electrical appliances such as refrigerators, ovens, washers, driers, dishwashers, thermostats, alarms, air conditioners, televisions, radios, receivers, amplifiers, and so forth. The devices 135A-C may also include consumer devices such as digital watches, music players, game consoles, digital cameras, printers, and so forth. Other examples of devices 135A-C include stationary devices such as HVAC systems, traffic lights, factory controllers, signs, electronic billboards, sprinkler systems, and irrigation control systems, as well as medical devices. The embedded systems 150A-C may also be referred to as network-connected devices. Devices 135A-C may also be any other type of device that includes an embedded system. Alternatively, one or more devices 135A-C may not include an embedded system.

An embedded system 150A-C is a class of computing device that is embedded into another device as one component of the device. The device 135A-C typically also includes other hardware, electrical and/or mechanical components that may interface with the embedded system 150A-C. Embedded systems 150A-C are typically configured to handle a particular task or set of tasks, for which the embedded systems 150A-C may be optimized. Accordingly, the embedded systems 150A-C may have a minimal cost and size as compared to general computing devices.

The embedded systems 150A-C may each include a communication module (not shown) that enables the embedded system 150A-C (and thus the device 135A-C) to connect to LAN 165 or to a wireless carrier network (e.g., that is implemented using various data processing equipment, communication towers, etc.). The communication module may be configured to manage security, manage sessions, manage access control, manage communications with external devices, and so forth.

In one embodiment, the communication module is configured to communicate using Wi-Fi®. Alternatively, the communication module may be configured to communicate using Bluetooth®, Zigbee®, Internet Protocol version 6 over Low power Wireless Area Networks (6LowPAN), power line communication (PLC), Ethernet (e.g., 10 Megabyte (Mb), 100 Mb and/or 1 Gigabyte (Gb) Ethernet) or other communication protocols. If the communication module is configured to communicate with a wireless carrier network, then the communication module may communicate using Global Systems for Mobile Communications (GSM), Code-Division Multiple Access (CDMA), Universal Mobile Telecommunications Systems (UMTS), 3GPP Long Term Evaluation (LTE), Worldwide Interoperability for Microwave Access (WiMAX), or any other second generation wireless telephone technology (2G), third generation wireless telephone technology (3G), fourth generation wireless telephone technology (4G) or other wireless telephone technology.

The LAN 165 includes a router, switch, bridge or other network device (not shown) that enables communication between multiple devices connected to the LAN 165. The network device may provide wired connections to the LAN using, for example, Ethernet ports, universal serial bus (USB) ports and/or Firewire® ports. The network device may additionally provide wireless connections to the LAN using, for example, a Wi-Fi transceiver.

Some embedded systems 150A-C may not support any of the communication types supported by the network device. For example, device 135C may support Zigbee, and device 135B may support Bluetooth. To enable such devices to connect to the LAN 165, the LAN 165 may include a gateway device 190 connected to the network device via one of the connection types supported by the network device (e.g., via Ethernet or Wi-Fi). The gateway device 190 may additionally support other communication protocols such as Zigbee, PLC and/or Bluetooth, and may translate between supported communication protocols. Accordingly, some devices (e.g., device 135C) may connect to the LAN 165 and/or to the WAN 170 through the gateway device 190.

The LAN 165 (or wireless carrier) is connected to a wide area network (WAN) 170. The WAN 170 may be a private WAN (e.g., an intranet) or a public WAN such as the Internet, or may include a combination of a private and public network. The LAN 165 may include a router and/or modem (e.g., a cable modem, a direct serial link (DSL) modem, a Worldwide Interoperability for Microwave Access (WiMAX®) modem, an long term evolution (LTE®) modem, etc.) that provides a connection to the WAN 170.

The WAN 170 may include or connect to one or more server computing devices 125A-B. The server computing devices 125A-B may include physical machines and/or virtual machines hosted by physical machines. The physical machines may be rackmount servers, desktop computers, or other computing devices. In one embodiment, the server computing devices 125A-B include virtual machines managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

Server computing device 125A hosts one or more WAN accessible services 130, which may be a web based service and/or a cloud service (e.g., a web based service hosted in a cloud computing platform). A WAN accessible service 130 may maintain a session (e.g., via a continuous or intermittent connection) with one or more of the embedded systems 150A-C. Alternatively, the WAN accessible service 130 may periodically establish sessions with the embedded systems 150A-C. Sessions and connections may be between a virtual device 185A-C running on the server computing device 130 and the devices 135A-C.

Via a session with an embedded system 150A-C (or device 135A-C), WAN accessible service 130 may use an appropriate virtual device 185A-C to issue commands to the embedded system (or device 135A-C) and/or receive status updates from the embedded system (or device 135A-C). Thus, the virtual device 185A-C may be used to control the device 135A-C. The commands may be commands to change a state of one or more parameters of a device controllable by the embedded system. For example, if the embedded system is embedded in a heater or thermostat, then the commands may include commands to increase or decrease a temperature. In another example, if the embedded system is embedded in a home automation system, then the commands may include commands to turn on or off lights.

Status updates received from the embedded systems 150A-C may identify values or states of some or all detectable parameters of devices 135A-C that the embedded systems are included in. Status updates may also include fault information, statistical device usage information, trace data and/or other information. Such values, states and/or other information may change based on direct user interaction with the devices. Such values, states and/or other information may also change responsive to commands sent to the embedded systems 150A-C by the WAN accessible service 130 and/or by computing devices 105A-C via an appropriate virtual device 185A-C. Moreover, values, states and other information of the embedded systems 150A-C may change based on environmental conditions of the embedded systems. By maintaining or periodically establishing sessions with the embedded systems 150A-C, the WAN accessible services 130 may maintain up-to-date information on the devices 135A-C, and such up-to-date information may be reflected in a virtual device 185A-C.

In one embodiment, WAN accessible services 130 include a template manager 126 and a virtual device manager 128. The template manager 126 creates, modifies and otherwise manages a pool of device templates. Template manager 126 may generate and/or modify templates without users performing any programming. In one embodiment, template manager 126 provides a user interface (e.g., a graphical user interface) that enables users to easily define device attributes in a device template. The template manager 126 is discussed in greater detail below with reference to FIG. 2A.

Referring back to FIG. 1, each device template defines one or more attributes for a device 135A-C. The attributes may be physical attributes that are hard wired, hard coded or manufactured into the device 135A-C. Examples of such physical attributes include sensors and sensor capabilities, input devices (e.g., buttons) and operations of the input devices, output devices (e.g., speakers, a display, etc.) and operations of the output devices, servos and servo settings, motors and motor settings, and so forth. Physical attributes may additionally include capabilities, behaviors, characteristics, etc. of firmware and/or software that is loaded into the devices 135A-C (e.g., into embedded systems 150A-C) in the devices.

Each device template additionally defines one or more logical or behavioral attributes for a device 135A-C. Logical attributes (also referred to as behavioral attributes) may include business logic such as behaviors, notifications, rules, access control, derived properties, and so forth that may not be programmed into a device. The logical attributes may instead be provided by a virtual device 185A-C on behalf of a physical device 135A-C. For example, a thermostat may include temperature set points and controls for changing the temperature set points. A virtual device established for the thermostat may include a rule stating that a temperature minimum of 70 degrees Fahrenheit is to be applied at 7:00 AM on weekdays. The virtual device may change the temperature set point to 70 degrees Fahrenheit internally and may send a command to the physical device to change the set point to 70 degrees Fahrenheit on the physical device. In this example, the temperature set point and the controls usable to set the temperature set point would be considered physical attributes of the physical device, and the rule for controlling when to change the temperature set point would be considered a logical attribute assigned to the physical device.

The template manager 126 additionally associates templates to devices 135A-C. In one embodiment, template manager 126 associates each type of device with a particular template or combination of templates. A device type may include a particular manufacturer (OEM), a particular model number and/or a particular version number (e.g., a firmware version number). Thus, different templates may be used based on manufacturer, device model and/or firmware version.

Virtual device manager 128 generates an instance of a virtual device 185A-C for each physical device 135A-C. The physical devices 135A-C may each have the same device type or may have different device types from the same or different manufacturers. For example, a separate virtual device 185A-C may be created for each unit of a particular product of an OEM.

Each virtual device 185A-185C is generated from one or a set of device templates. The created virtual device 185A-C inherits device attributes from each of the device templates used to create the virtual device. The virtual device 185A-C is then connected to a particular physical device 135A-C (e.g., to an embedded system 150A-C of a particular physical device 135A-C), and may be used to monitor, interface with, and control that physical device.

Server computing devices 125B include one or more third party services 162. Third party services 162 may be services provided by entities other than a provider of an IoT platform that includes WAN accessible services 130. As shown, server computing devices 125B may connect to server computing device 125A directly or via WAN 170. Examples of third party services include weather services (e.g., that provide live weather feeds), time services (e.g., an atomic clock), a rich site summary (RSS, also known as really simple syndication) feed, earthquake data for an area (e.g., usable to shut off utilities in the event of a large earthquake), an OEM hosted service that keeps track of customer payments (e.g., usable to turn off device controls if payment is not received), and so on. For actions involving external services, a user may enter their credentials or go through an authorization procedure to provide authorization to perform actions on the user's behalf with regards to the external services.

Virtual devices 185A-C may interface with third party services 162 on behalf of associated physical devices 135A-C. Virtual devices 185A-C may interface with the third party services 162 to obtain information usable to update the devices. Additionally, virtual devices 185A-C may interface with the third party services 162 to provide notifications and information about physical devices 135A-C.

Computing devices 105 may include portable devices such as electronic book readers, portable digital assistants, mobile phones, laptop computers, portable media players, tablet computers, cameras, video cameras, netbooks, notebooks, and the like. Computing devices 105 may also include traditionally stationary devices such as desktop computers, gaming consoles, digital video disc (DVD) players, media centers, and the like. Computing devices 105 may connect to the WAN 170 and/or to the LAN 165.

Computing devices 105 may include a remote control application (or multiple remote control applications) 115 that can receive information for devices 135A-C and control the devices 135A-C via virtual devices 185A-C. The remote control application 115 is configured to interface with one or more virtual devices 185A-C, and may issue commands to the connected virtual devices 185A-C. The virtual devices 185A-C may then format the commands into a protocol used by associated physical devices 185A-C and/or generate new commands in such a protocol. The virtual devices 185A-C may then send the new or modified commands to associated physical devices 135A-C (e.g., via the devices' embedded systems 150A-C) to control the physical devices 135A-C.

The remote control application 115 may be programmed to run on various operating systems, such as Windows® operating systems, Unix® operating systems, iOS® operating systems, Android® operating systems and Java® operating systems to name a few. The remote control application 115 may also be configured as firmware, or as hardware, or as some combination of software, firmware and/or hardware. The remote control application 115 may include a graphical user interface (GUI) that enables users to interact with and control devices 135A-C in an intuitive and user-friendly manner. A user may interact with the GUI to cause the remote control application to generate notifications, commands, property updates and other messages for the devices represented in the GUI.

In one embodiment, the remote control application 115 interfaces with the template manager 126 to generate new templates to modify existing templates. Template manager 126 may provide an application programming interface (API) that is used by remote control application 115 to generate and/or modify templates. Alternatively, users may access template manager 126 to generate and/or modify rules via a web interface that is accessible from a web browser.

Figure 2A:
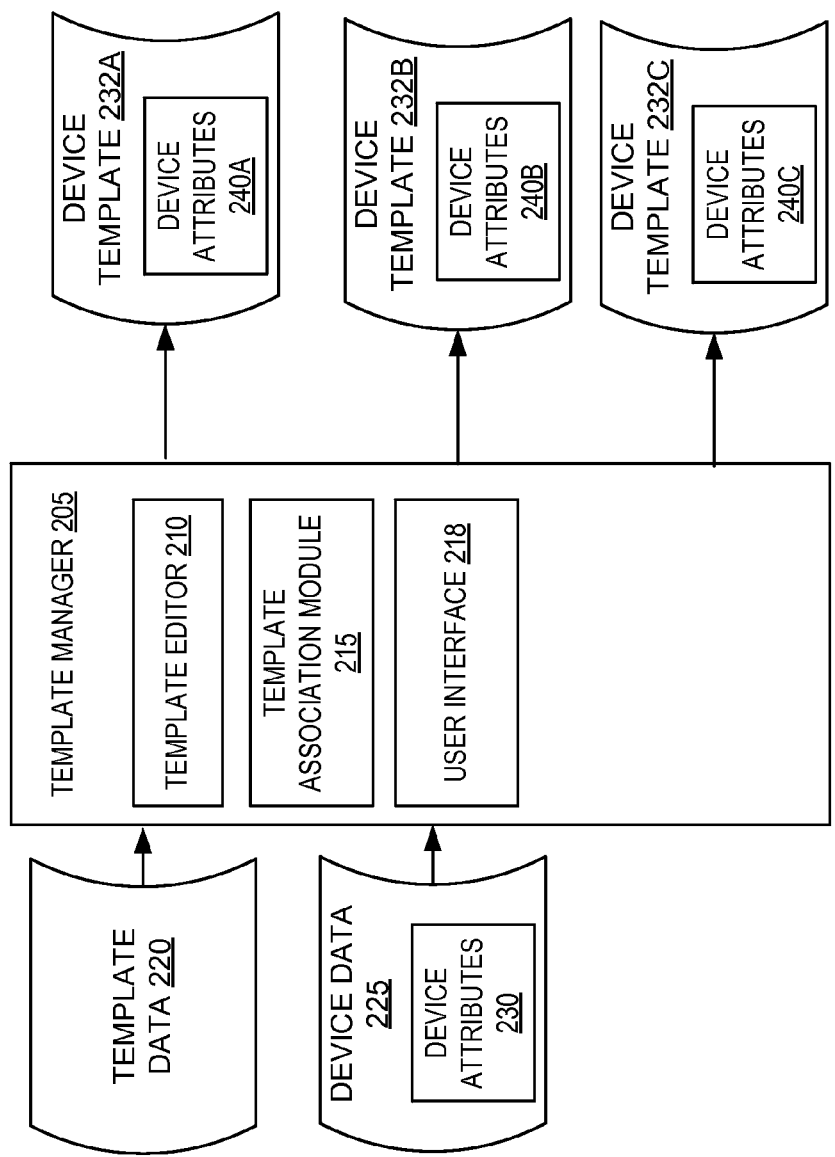
FIG. 2A is a block diagram of a template manager, in accordance with one embodiment of the present invention.

FIG. 2A is a block diagram of a template manager 205, in accordance with one embodiment of the present invention. In one embodiment, template manager 205 corresponds to template manager 126 of FIG. 1. Template manager 205 includes functionality for designing, creating, modifying, and otherwise managing device templates. The template manager 205 includes a template editor 210, a template association module 215 and a user interface 218. Alternatively, the functionality of the template editor 210, user interface 218 and/or template association module 215 may be divided into additional modules or may be combined into a single module.

Template editor 210 is responsible for creating new device templates and editing existing templates. Template editor 210 may create a blank template or may create a new template based on an existing template. Template editor 210 may receive template data 220 that is used to populate fields and/or entries in the template, where each field or entry may be for a particular device attribute. Template data 220 may be input or selected by a user via a user interface 218. Alternatively, or additionally, template data 220 may be imported from existing templates and/or from other sources.

Each device template 232A-C defines one or more device attributes 240A-C. The device attributes 240A-C may be physical attributes of a physical device and/or logical attributes that are to be provided by a virtual device for a physical device. Some device templates may be standalone templates that define all of the physical and logical attributes for a particular device (e.g., for a particular model and version of a device from a particular OEM). Additionally, some device templates may define only a subset of attributes for a physical device. For example, a first template may be created for the logical attributes of a device and a second template may be created for the physical attributes of the device. A physical property template may specify a set of physical attributes of a device such as sensors of the device, controls for the device, and/or other capabilities of the device. The physical property template may be the lowest level template for a device, and may map to the actual commands and capabilities of the device. Thus, the physical property template may define the core data model for the physical device and provide the raw API for interfacing with and controlling the device.

In some instances device templates may be created for use with multiple different devices that share some characteristics. For example, a single device template may be created to be used for multiple different models of a similar type of device from a particular OEM. In another example, a single device template may be set up that defines the properties of a particular component that may be shared by many devices or a particular protocol that may be used by many devices. For example, a device template may be created for the Zigbee protocol or the Wi-Fi 802.11n protocol. These device templates may then be used for any device that uses the particular protocol for which the device template was created. In another example, a template may be created that defines business logic that an OEM might want to apply across many different types of devices. For example, a template may be set up that includes notification rules identifying what entities to send notifications to and under what circumstances. For example, a notification template may provide third party integration with a third party service that tracks connectivity events. This can be enabled at any time on millions of devices by associating a new notification template that contains a universal resource locator (URL) and authentication parameters for the third part service.

In one embodiment, a device roles template may be created that defines roles associated with virtual devices created from the template. Each role may grant access to a set of resources. Examples of roles include an end-user or consumer role, an original equipment manufacturer (OEM) administrator role, an OEM account manager role, a dealer role, a technician role, and so forth. An OEM administrator role may have access to all OEM user profiles of an organization and end user profiles of those who are consumers of the OEMs products. A dealer role may have access to a consumers profile and other information if the consumer grants the dealer access. Resources may be network-connected devices, attributes or parameters of network-connected devices, other users, and so on. For example, an OEM may want to sell devices though a dealer and enable that dealer to monitor devices sold through the dealer (e.g., for maintenance). This has access control implications because it enables dealers to access devices of consumers. With a new role template assigned to devices, any user with the role of dealer may be able to access those devices, subject to access control checks.

In one embodiment, a device registration template may be created that defines what registration techniques to use to register devices to user accounts. When a device is purchased by an end user, that device may initially not be registered to any user accounts. The end user may desire to register the device to his user account to gain access to and control over that device. For example, a user may purchase and install an Internet enabled oven, dishwasher, dryer or washer. By registering the Internet enabled device to a user account, that user account gains the ability to monitor and/or control that device. In one embodiment, the user account may be granted one of multiple different permission levels through the registration process. A first permission level may permit monitoring of a device, but not permit any control of the device. A second permission level may permit control of some (e.g., a subset of all) device functions or settings, and a third permission level may permit control of all device functions and settings, as an example.

The registration template may define one or more registration techniques to be used to register an unregistered device. The defined registration techniques may be registration techniques that are supported by the device. Each registration technique may be associated with one or more registration operations. The specific registration operations that are performed depend on the specific registration technique that was selected. Examples of operations that may be performed include receiving registration information from an unregistered device, prompting a user to input registration information, generating registration information, sending registration information to an unregistered device, and sending registration information and/or other information to a registration service. Additionally, the types of registration information that is gathered may differ between registration techniques and the registration criteria may differ for different registration techniques.

In a first example registration technique, a remote control application causes a screen of a mobile device that the remote control application is running on to pulsate in a manner that provides a code to the device. The device may then report the code to a registration service for registration. In a second example, the unregistered device displays a unique code on a display, and a user views the unique code and provides it to a registration service for registration. In a third example, a user receives a unique code from a web site, via a text message, via email, etc., and provides the unique code to the device for registration. Many other registration techniques are also possible.

The registration template may additionally include rules that control which registration techniques to apply under differing circumstances. In one example, a registration technique selection rule indicates that a registration technique is to be selected based on a location of the unregistered device. For example, an OEM may specify that a first registration technique is to be used for devices in Europe, a second registration technique is to be used for devices in China, and a third registration technique is to be used for devices in the United States. In another example, a registration technique selection rule indicates that a registration technique is to be selected based on a role of the user account that the remote control application is logged into. Accordingly, a first registration technique may be used if a dealer is installing the unregistered device in a customer's home, and a second registration technique may be applied if the customer is installing the unregistered device herself. Many other registration technique selection rules may also be applied.

In one embodiment, a device rules template may be created that defines rules for performing actions such as sending notifications, sending commands, and so forth. Each rule may take one or more events as inputs and produces as outputs messages, notifications and/or commands. The inputs may be received from one or more network connected devices and/or services, and the outputs may be sent to one or more network connected devices and/or services. The outputs may be sent to the same network connected devices from which the inputs were received or to other network connected devices. In one embodiment, each input and output to is modeled as a feed. A feed can be an input feed, which triggers an action, or an output feed, which may be the action itself. The loosely coupled feeds may be tied together by user defined rules.

Some templates may include derived properties for a physical device. A derived property is a logical property or attribute that is derived from another (usually physical) property or attribute (or set of other properties or attributes) of a physical device. A derived property may include a definition of operations to perform on values of one or more other attributes. For example, a thermostat may be hard wired with a sensor that measures temperature in Fahrenheit. However, that thermostat may be sold in countries in which Celsius units are used to measure temperature. Accordingly, a derived property may be set up that converts Fahrenheit temperature measurements to Celsius temperature measurements. Other attributes of the device that are user facing may then be set up to perform actions and display data based on the derived property rather than the base attribute that is actually used by the physical device. Thus, it may appear to users that the device functions in Celsius even though the device functions in Fahrenheit. The derived property may additionally convert commands from users and/or triggered by other attributes into the values and units that are used by the physical device. Derived properties enable a virtual device to present the same data from a physical device in many different ways. Other examples of derived properties are various statistics that may be computed from one or more other properties. For example, a derived property may be an average of another property, or a delta between two values from one or more other attributes (e.g., start and stop time). Many other types of derived properties may also be set up in templates.

Template editor 210 may assign scopes to created templates. The scope may control what entities may view, use and/or modify those templates. One example scope is a private scope. A template with a private scope is only viewable to a creator of the template. Another example scope of a template is an OEM scope. A template with an OEM scope is viewable to anyone from the OEM organization. Another example scope is a public scope. A template with a public scope may be publicly viewable. Examples of some publicly viewable templates include templates configured for public standards (e.g., a Zigbee smart plug template that defines the Zigbee smart plug data model that can be used for any smart plug compliant with the Zigbee standard, an Apple® homekit data model that can be used for any device complying with a particular specification, etc.). Another example scope is an enterprise customer scope that may be viewable to an OEM and to a particular enterprise customer of that OEM.

Template association module 215 associates specific devices and/or types of devices to device templates 232A-C. A single device (e.g., a particular product of an OEM) may be associated with a single device template or with multiple different device templates. The device may be identified by a product identifier assigned to that device. Device templates may be reused within an OEM and/or between OEMs (for public device templates). Accordingly, multiple different devices may each be associated with the same device template. Accordingly, if the same change is to be made to all of these devices, the change may be implemented by modifying the device template that is associated with each of the devices.

In some instances an OEM may choose to offer premium content that may provide an enhanced experience to some customers but not to others. Such premium content may be offered simply by associating a different device template that has attributes/properties that provide the premium content. In other instances, premium content may be provided by sending a firmware upgrade to a physical device, and accompanying the firmware upgrade with an upgraded template associated with that physical device. Template association module 215 may detect that a firmware upgrade has been pushed to a physical device, and may automatically associate a new template corresponding to that firmware upgrade to the physical device. Alternatively, the new template may be associated with the physical device before a firmware upgrade has been issued to that physical device. Template manager 205 may detect that the new template relies upon functionality provided by the firmware upgrade, and may automatically download and install the firmware upgrade onto the physical device in response.

User interface 218 is an intuitive interface for creating and editing device templates. User interface 218 may be a graphical user interface (GUI) or a functional user interface. User interface 218 may provide a collection of graphical icons, visual indicators, buttons, toggles, sliders, and so forth that represent states and values of different parameters and attributes for devices that are to be included in a template. A user may interact with the user interface 218 to assign device attributes to a template. Template manager 205 may also provide an application programming interface (API) that other applications (e.g., a remote control application) can use to edit and create templates.

User interface 218 may provide options for selecting device attributes for a template. User interface 218 may provide a drop down menu or other listing of common device attributes. These may include parameters, settings, features, notifications, business logic, roles, rules, registration techniques, etc. that may be used in a template. User interface 218 may also enable users to define new attributes. The user interface 218 may also provide a drop down menu or other interface for users to associate device templates with particular devices or types of devices.

Figure 2B:
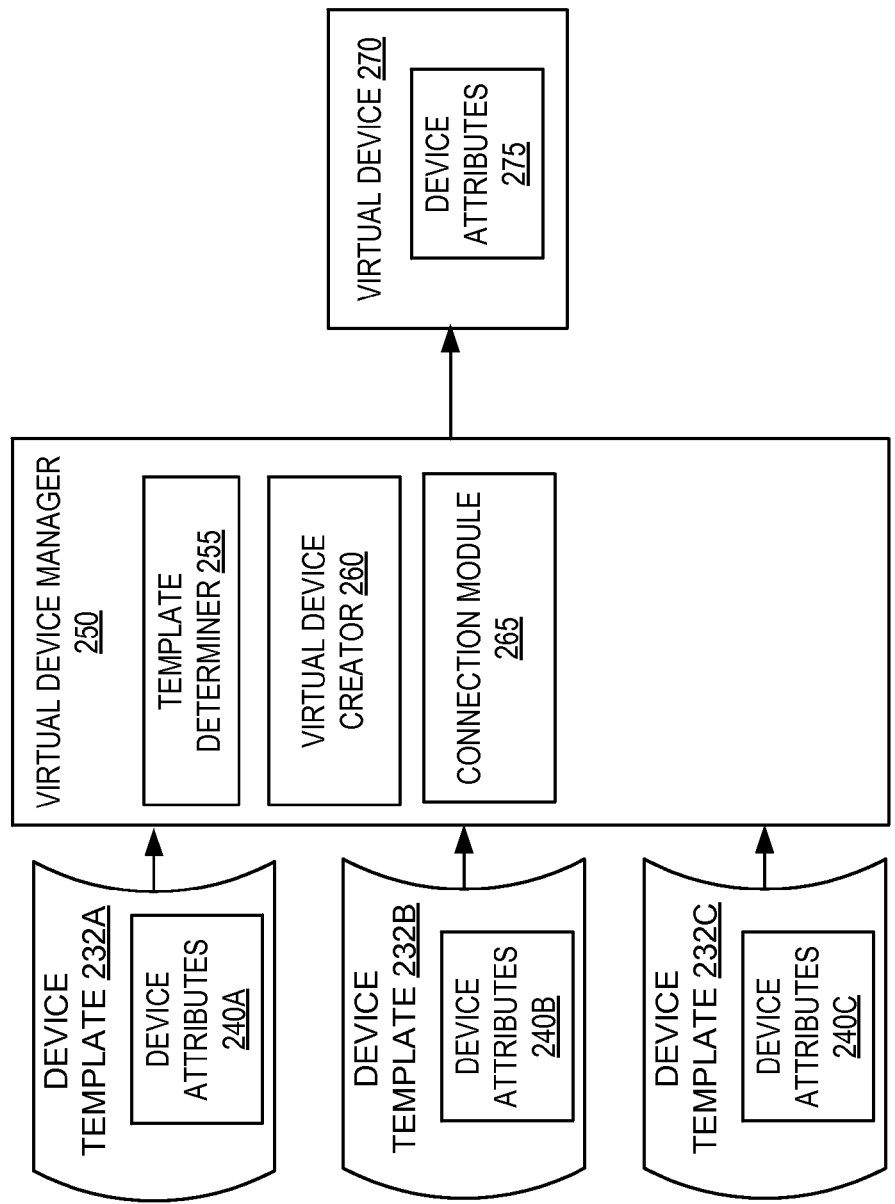
FIG. 2B is a block diagram of a virtual device manager, in accordance with one embodiment of the present invention.

FIG. 2B is a block diagram of a virtual device manager 250, in accordance with one embodiment of the present invention. In one embodiment, virtual device manager 250 corresponds to virtual device manager 128 of FIG. 1. Virtual device manager 250 includes functionality for creating virtual machines and connecting virtual machines together and to physical devices. The virtual device manager 250 includes a template determiner 255, a virtual device creator 260 and a connection module 265. Alternatively, the functionality of the template determiner 255, virtual device creator 260 and/or connection module 265 may be divided into additional modules or may be combined into a single module.

When a network connected device (also referred to as a physical device) gains network access, is powered on, etc., that physical device may send a message to virtual device manager 250 notifying virtual device manager 250 of that device. The notification may include information identifying a particular device model, an OEM, a version number, a media access control (MAC) address, a serial number, a network address of the physical device, etc. For example, the notification may include a unique device identifier.

Template determiner 255 may use the provided information to determine a device type for the physical device. Template determiner 255 may additionally determine which device templates 232A-C are associated with that device type, where each of the device templates 232A-C includes different device attributes 240A-C. Template determiner 255 may then invoke virtual device creator 260 and pass to virtual device creator 260 the network address of the physical device and an identification of the device templates 232A-C associated with that physical device.

Virtual device creator 260 generates a virtual device 270 from the identified device templates 232A-C associated with the physical device. The virtual device 270 may be a data structure that mimics the physical device. The virtual device inherits device attributes 240A-C from the device templates 232A-C, which together make up device attributes 275. The device attributes 275 may include a superset of attributes that the physical device actually has (e.g., of physical device attributes). For example, device attributes 275 may additionally include logical device attributes that are implemented by a server computing device on behalf of a physical device. The fact that some operations of the device are performed on the server (e.g., in the cloud), and that other operations are actually performed on the physical device may be transparent to end users.

Once the virtual device 270 is created, connection module 265 connects the virtual device 270 to the physical device. A separate virtual device is created for each physical device. Each virtual device may then be used to manage and control the particular physical device that it is connected to over a network.

Figure 3A:
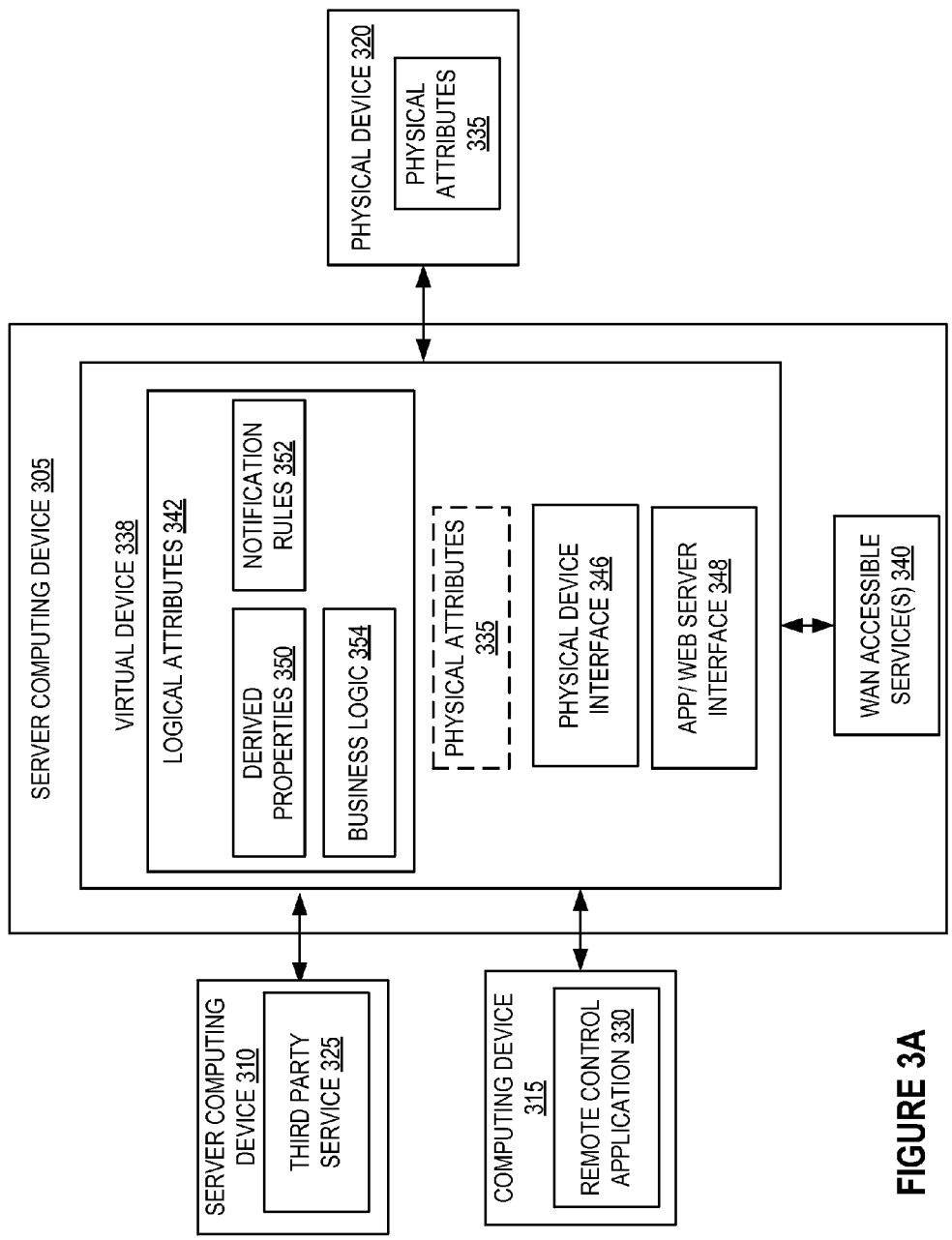
FIG. 3A is a block diagram depicting interactions between a virtual device and additional devices.

FIG. 3A is a block diagram depicting interactions between a virtual device 338 and additional devices (e.g., a physical device 320, a server computing device 310 and a computing device 315). A server computing device 305 hosts virtual device 338 as well as one or more WAN accessible services 340. The virtual device 338 is a virtual device that has been created for physical device 320, which is connected to virtual device 338 over a network.

Physical device 320 possesses a set of physical attributes 335. Each physical attribute is an attribute of the physical device 320 that the physical device 320 has with or without connection to a virtual device. Physical attributes 335 may include inputs and outputs of the physical device, controls usable to control the physical device 320, components of the physical device, set points and value ranges of the components, and so forth. The functionality of the physical device 320 may be greatly augmented by the use of virtual device 338.

Virtual device 338 may include all of the physical attributes 335 of the physical device. In addition, virtual device 338 may include many logical attributes (e.g., properties, characteristics, behaviors, functionality, etc.) that the virtual device 338 possesses on behalf of the physical device, and which the physical device does not inherently possess. Examples of such logical attributes include derived properties 350, notification rules 352, business logic (e.g., roles, additional rules, registration techniques, etc.) 354, and so on. Virtual device 338 may additionally include a physical device interface 346 that is usable to send instructions to the physical device 320 and receive data from the physical device 320. Virtual device 338 may additionally include an application (app) and/or web server interface 348 for communicating with WAN accessible services 340, third part services 325 and/or remote control applications 330. Based on the logical and/or physical attributes of the virtual device 338, the virtual device may generate commands and/or notifications that are sent to the third party service 325, WAN accessible service 340 and/or remote control application 330 via the app/web server interface 348.

Figure 3B:
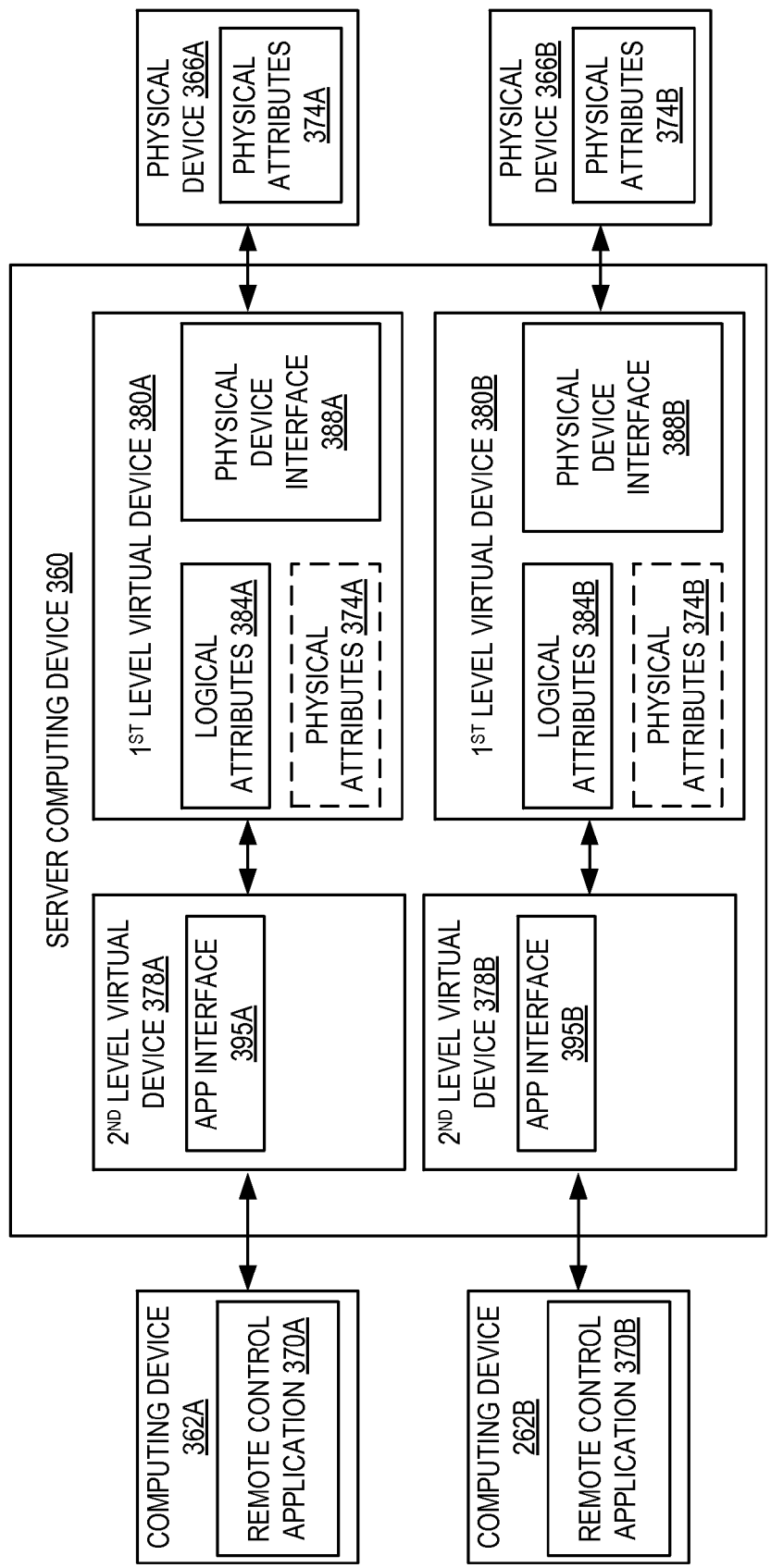
FIG. 3B is an additional block diagram depicting interactions between virtual devices and additional devices.

FIG. 3B is an additional block diagram depicting interactions between virtual devices and additional devices. In some instances, multiple different virtual devices are generated for a particular physical device. For example, FIG. 3B illustrates a first level virtual device 380A and a second level virtual device 378A that have been created for a first physical device 266A and a first level virtual device 380B and a second level virtual device 378B that have been created for a second physical device 366B.

The use of multiple layers or levels of virtual devices for a physical device enables services and applications to indirectly interface with the physical devices 366A-B using a common application programming interface (API), even though the physical devices 366A-B may be different devices from different manufacturers and with different physical attributes 374A-B. Additionally, use of second level virtual devices 378A-B enables services and applications (e.g., remote control applications 370A-B) to interface with and control the first level virtual devices 380A-B even though the first level virtual devices 380A-B may have different logical attributes 384A-B, physical attributes 374A-B and physical device interfaces 388A-B.

In an example, physical device 366A may be a thermostat from a first manufacturer with a distinct set of physical attributes 374A. First level virtual device 380A may be configured with the physical attributes 374A of the physical device 366A and with logical attributes 384A specific to that physical device 366A. Physical device 366B may be a dishwasher from a second manufacturer with a distinct set of physical attributes 374B. First level virtual device 380B may be configured with the physical attributes 374B of the physical device 366B and with logical attributes 384B specific to that physical device 366B. Second level virtual device 378A and second level virtual device 378B may be separate instances of virtual devices generated from the same templates. Each of the second level virtual devices 378A-B may include a common API that remote control applications 370A-B can use to communicate with the second level virtual devices 378A-B. The second level virtual devices 378A-B include application interfaces 395A-B that translate commands from the remote control applications 370A-B into commands that can be acted on by the specific first level virtual devices 380A-B. Additionally, the second level virtual devices 378A-B may translate data from the first level virtual devices 380A-B into a common format that can be used by the remote control applications 370A-B. This enables a single remote control application 370A-B to be used to interface with and control multiple different types of devices.

Figure 4A:
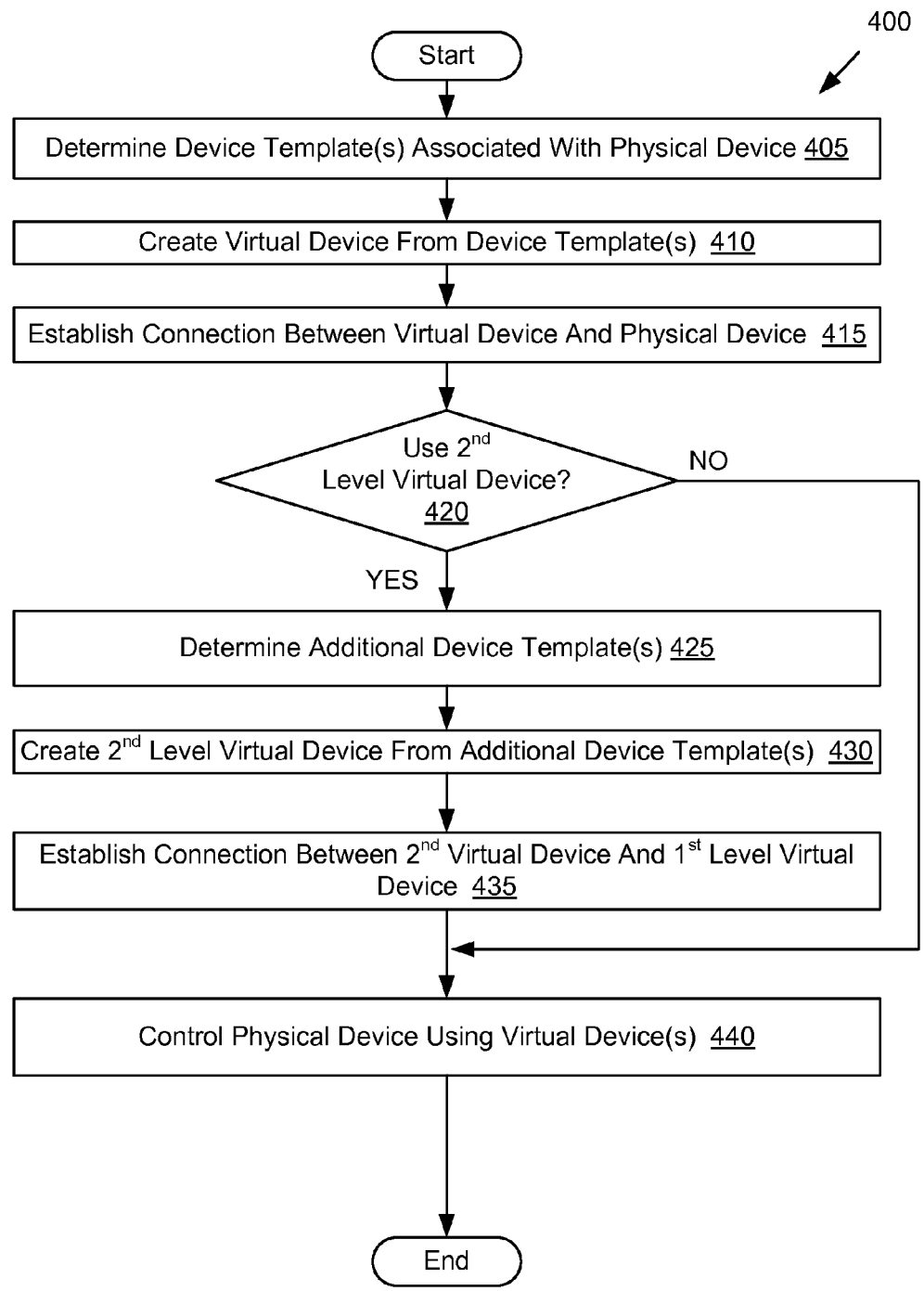
FIG. 4A is a flow chart of one embodiment for a method of using a virtual device to control a physical device.
Figure 4B:
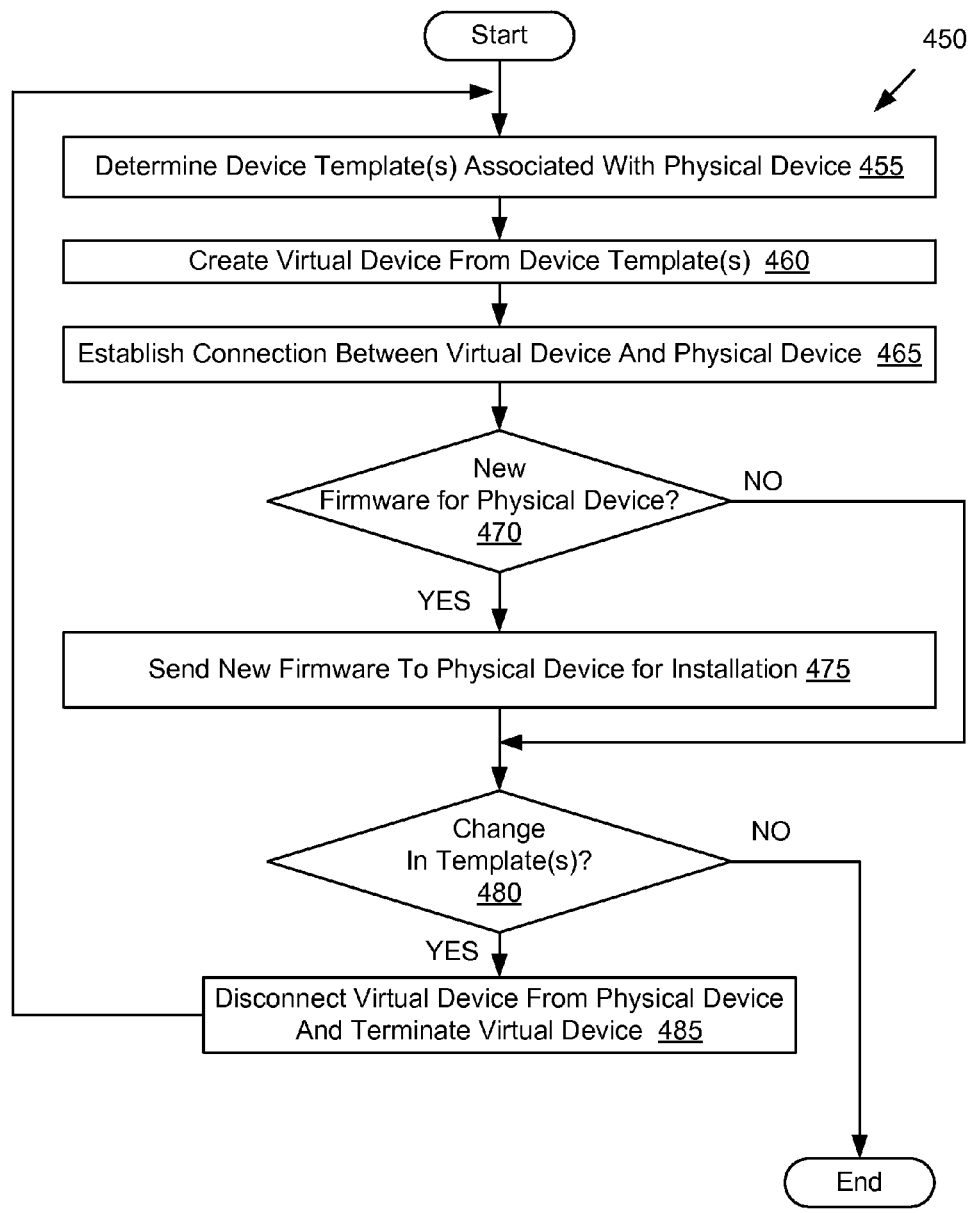
FIG. 4B is a flow chart of one embodiment for a method of changing the properties and/or functionality for a physical device based on changing one or more templates associated with that physical device.
Figure 5:
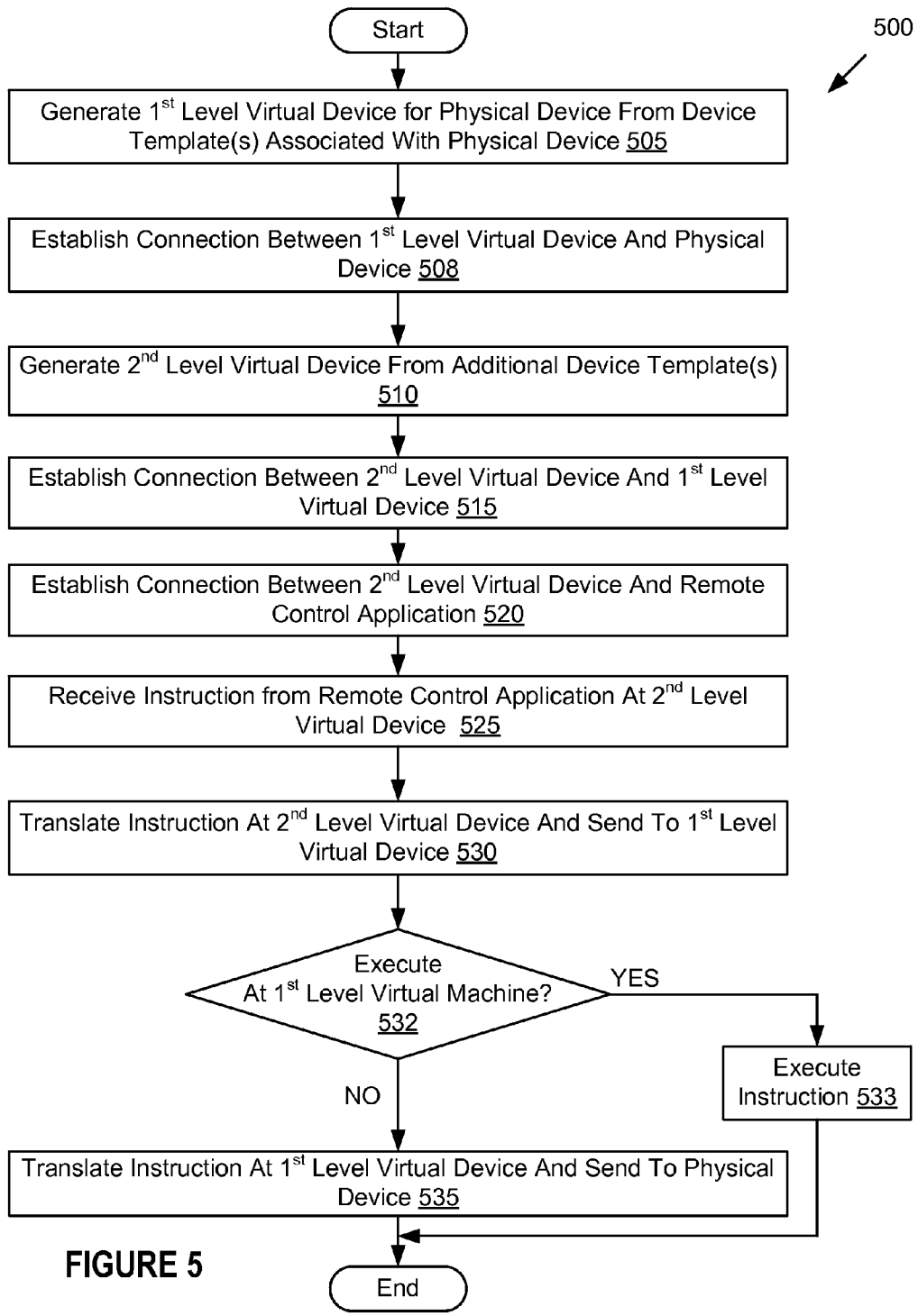
FIG. 5 is a flow chart of another embodiment for a method of using virtual devices to control a physical device.

FIGS. 4A-5 are flow diagrams showing various methods of implementing virtual devices to augment and control the functionality of physical devices. The methods may be performed by a processing logic that may comprise hardware (e.g., circuitry, dedicated logic, programmable logic, microcode, etc.), software (e.g., instructions run on a processing device to perform hardware simulation), or a combination thereof. Various embodiments may be performed by a server computing device executing a virtual device (e.g., server computing device 125 of FIG. 1).

FIG. 4A is a flow chart of one embodiment for a method 400 of using a virtual device to control a physical device. At block 405 of method 400, processing logic determines one or more device templates that are associated with a physical device. The operations of block 405 may be performed automatically responsive to a physical device attempting to connect to a server and/or to one or more WAN accessible services. The operations of block 405 may also be performed at any other time responsive to a command to generate a new virtual device.

At block 410, processing logic creates a new virtual device from the determined device templates. At block 415, processing logic then establishes a connection between the virtual device and the physical device. The connection may be a continuous or intermittent connection.

At block 420, processing logic determines whether a second level virtual device will be used for the physical device. A second level virtual device may be used, for example, to provide a generic or common interface to services and/or applications. If a second level virtual device is to be used, the method continues to block 425. Otherwise the method proceeds to block 440.

At block 425, processing logic determines one or more additional device templates associated with the physical device. The additional device templates may be designated as second level device templates. These device templates may include the same, different and/or additional data to the device attributes included in first level device templates. This additional data may include a common instruction set for communicating with applications and services and translations between the common instruction set and instruction sets specific to many different physical devices and/or first level virtual devices. At block 430, processing logic creates a second level virtual device for the physical device from the one or more additional device templates. At block 435, processing logic connects the second level virtual device to the first level virtual device. The first and second level virtual devices may both execute on the same server machine. Accordingly, the connection between the first and second level virtual devices may be a logical connection.

At block 440, processing logic controls the physical device using the virtual device (or the multiple virtual devices). Controlling the physical device may include determining values to assign to parameters and/or settings of the physical device based on logical rules resident in the virtual device, and then sending controls to implement the determined values for the parameters and/or settings to the physical device. Controlling the physical device may additionally include receiving commands at the virtual device from a remote control application and forwarding those commands to the physical device (potentially after translating the commands into a format understandable to the physical device).

FIG. 4B is a flow chart of one embodiment for a method 450 of changing the properties and/or functionality for a physical device based on changing one or more templates associated with that physical device. At block 455 of method 450, processing logic determines one or more device templates that are associated with a physical device. At block 460, processing logic creates a virtual device from the determined device templates. At block 465, processing logic then establishes a connection between the virtual device and the physical device. The connection may be a continuous or intermittent connection.

At block 470, processing logic determines whether there are any new firmware upgrades or updates available for the physical device. If so, the method continues to block 475. Otherwise the method proceeds to block 480.

At block 475, processing logic performs an update (e.g., an over the air (OTA) update) of the physical device. This may include downloading an update to the physical device and causing the update to install on the user device.

The firmware update may or may not introduce new functionality that is to be accompanied by a modified device template. Additionally, in some instances new or modified device templates may be associated with physical devices without any firmware updates. For example, templates may be modified to implement new or different logical attributes or other cloud based functionality for the physical device without any firmware changes.

At block 480, processing logic determines whether there has been any change in the templates associated with the physical device. Changes to the associated templates may include modifications to existing templates previously associated with the physical device, the addition of new templates not formerly associated with the physical device and/or the removal of templates formerly associated with the physical device. If there has been any change in the templates associated with the physical device, the method continues to block 485. Otherwise the method ends.

At block 485, processing logic disconnects the virtual device from the physical device. Processing logic additionally terminates the virtual device. The method may then return to block 455 to determine the new associated device templates and create a new virtual device for the physical device.

The ability of a device to acquire new properties on the cloud after a firmware upgrade allows OEMs to push out changes without new cloud development (e.g., without writing new code for execution on server machines). Such new properties may be implemented simply by building a new template and/or pushing out a firmware upgrade to physical devices. Additionally, the properties, functionality and attributes of physical devices may be modified on-the-fly to devices that have already been deployed to customer locations. Such changes may be easily performed to all deployed and/or unsold devices. For example, OEMs may disable or enable certain roles (e.g., dealers) from having access to deployed devices at the push of a button.

OEMs may choose to implement changes to a subset of deployed devices. For example, OEMs may split a group of physical devices into a first subgroup and a second subgroup. The OEM may then associate a new unique template with the first subgroup. The OEM may then perform A-B testing between the subgroups to determine whether to implement the new unique template for all of the physical devices in the larger group. For example, a manufacturer of a washing machine may create a new template that adds a new spin cycle. This template may then be associated with 5% of deployed washing machines to provide the new spin cycle. If the new spin cycle is popular with customers, then the OEM may add the new spin cycle to the rest of the physical devices.

FIG. 5 is a flow chart of another embodiment for a method 500 of using virtual devices to control a physical device. At block 505 of method 500, processing logic generates a first level virtual device for a physical device from one or more device templates associated with the physical device. At block 508, processing logic establishes a connection between the first level virtual device and the physical device. At block 510, processing logic generates a second level virtual device from one or more additional device templates. At block 515, processing logic establishes a connection between the first level virtual device and the second level virtual device.

The second level virtual device provides a level of abstraction that enables multiple different types of virtual devices to connect to a common remote control application. For example, a washer manufacturer might have three basic first level templates that describe how their washers work. A second level template may be created the maps functions of the second level template to distinct but similar functions in each of the three different first level templates. Virtual devices from the same second level template would then be exposed to remote control applications for each of the three different washers. An OEM may additionally set up different second level templates for different roles. For example, an OEM second level template may be used to create virtual devices for communication with OEMs, and a dealer second level template may be used to create virtual devices for communication with dealers. These separate second level virtual machines may have different functionality, different interfaces, etc.

At block 520, processing logic establishes a connection between the second level virtual device and a remote control application (e.g., that may execute on a mobile device). At block 525, processing logic receives an instruction from the remote control application at the second level virtual device. At block 530, processing logic translates the instruction at the second level virtual device into a new instruction that the first level virtual device can act upon. This may include generating a new instruction from the received instruction.

At block 532, processing logic may determine whether the instruction can be implemented at the virtual device or whether the instruction should be implemented at the physical device. If the instruction should be implemented at the physical device, the method continues to block 535. Otherwise, the method continues to block 533 and the instruction is executed by processing logic at the first virtual device.

At block 535, processing logic translates the instruction at the first level virtual device into an instruction that the physical device can act upon. This may include generating a new instruction based on the received instruction. Processing logic may then send the instruction to the physical device. After the instruction has been executed updated data (e.g., an updated device state and/or other notification) may be sent to the second level virtual device, which may then forward the data on to the remote control application.

Figure 6:
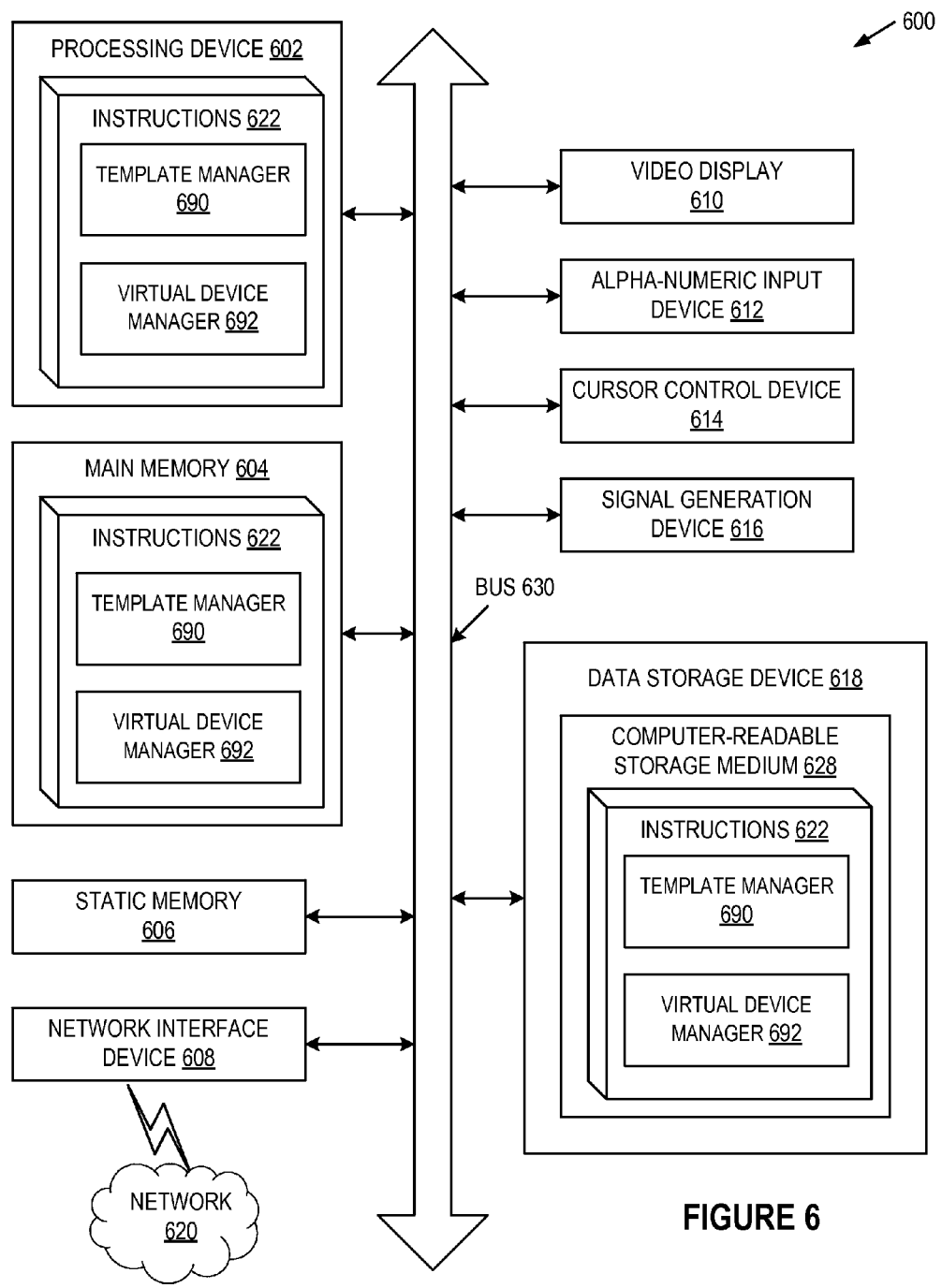
FIG. 6 illustrates a block diagram of one embodiment of a computing device.

FIG. 6 illustrates a diagrammatic representation of a machine in the example form of a computing device 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory (e.g., a data storage device 618), which communicate with each other via a bus 630.

Processing device 602 represents one or more general-purpose processors such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the processing logic (instructions 622) for performing the operations and steps discussed herein.

The computing device 600 may further include a network interface device 608. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium (or more specifically a computer-readable storage medium) 628 on which is stored one or more sets of instructions 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting computer-readable storage media.

The computer-readable storage medium 628 may also be used to store a template manager 690 or a virtual device manager 692 (as described with reference to FIGS. 2A-2B), and/or a software library containing methods that call a template manager 690 or virtual device manager 692. While the computer-readable storage medium 628 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

The modules, components and other features described herein (for example in relation to FIGS. 1-2B) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "determining", "creating", "establishing", "controlling", "translating", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
 determining, by a processing device, a first plurality of device templates associated with a first physical device, wherein each of the first plurality of device templates defines one or more device attributes, and wherein the first physical device comprises an embedded system;
 creating, by the processing device, a first virtual device from the first plurality of device templates, wherein the first virtual device inherits the one or more device attributes from the first plurality of device templates;
 establishing a connection between the first virtual device and the first physical device over a network;
 receiving, by the first virtual device, one or more commands to perform an action from a remote computing device distinct from the processing device, the one or more commands initially having a first format;
 reformatting, by the first virtual device, the one or more commands into a second format associated with the first physical device;
 sending the one or more commands to perform the action from the first virtual device to the first physical device via the connection, wherein the one or more commands are sent to the first physical device in the second format; and
 receiving, at the first virtual device, one or more status updates from the first physical device via the connection.

2. The method of claim 1, wherein the first physical device comprises physical device attributes, and wherein the first virtual device comprises a superset of device attributes comprising the physical device attributes of the first physical device and logical device attributes provided for the first physical device by the first virtual device.

3. The method of claim 1, wherein the first physical device is deployed to a customer location, the method further comprising:
 determining a second plurality of device templates associated with the first physical device, wherein at least one of the second plurality of device templates defines a new device characteristic;
 creating a second virtual device from the second plurality of device templates, wherein the second virtual device inherits the new device characteristic;

establishing a new connection between the first physical device and the second virtual device; and controlling the first physical device using the second virtual device.

4. The method of claim 3, further comprising:

creating the second virtual device responsive to determining that firmware of the first physical device has been updated, the firmware comprising the new device characteristic.

5. The method of claim 1, further comprising:

determining a second plurality of device templates associated with a second physical device, wherein the second plurality of device templates comprises at least one common device template with the first plurality of device templates;

creating a second virtual device from the second plurality of device templates;

establishing a new connection between the second physical device and the second virtual device; and controlling the second physical device using the second virtual device.

6. The method of claim 1, wherein reformatting the one or more commands comprises translating the one or more commands into new commands that are operable for the first physical device.

7. The method of claim 1, wherein the first plurality of device templates comprise a physical attributes device template that defines physical attributes of the first physical device and instructions for controlling the first physical device, a notification template that defines entities to notify when specified conditions are satisfied, and a role template that defines entities that have access to the first physical device.

8. A non-transitory computer readable storage medium having instructions that, when executed by a processing device, cause the processing device to perform operations comprising:

creating, by the processing device, a first virtual device for a first physical device from a first device template associated with the physical device, wherein the first virtual device inherits a first set of device attributes from the first device template;

after a change to the first device template, creating a second virtual device for the first physical device from the changed first device template, wherein the second virtual device inherits at least one new device attribute not included in the first set of device attributes from the changed first device template;

establishing a connection between the second virtual device and the first physical device over a network;

receiving, by the second virtual device, one or more commands to perform an action from a remote computing device distinct from the processing device, the one or more commands initially having a first format;

reformatting, by the second virtual device, the one or more commands into a second format associated with the first physical device;

sending the one or more commands to perform the action from the second virtual device to the first physical device via the connection wherein the one or more commands are sent to the first physical device in the second format; and receiving, at the second virtual device, one or more status updates from the first physical device via the connection.

9. The non-transitory computer readable storage medium of claim 8, wherein the first virtual device is created from a first plurality of device templates associated with the physical device, wherein the first virtual device inherits the first set of device attributes from the first plurality of device templates.

10. The non-transitory computer readable storage medium of claim 9, the operations further comprising:

determining a second plurality of device templates associated with a second physical device, wherein the second plurality of device templates comprises at least one common device template with the first plurality of device templates;

creating a third virtual device from the second plurality of device templates;

establishing a new connection between the second physical device and the third virtual device; and controlling the second physical device using the third virtual device.

11. The non-transitory computer readable storage medium of claim 9, wherein the first plurality of device templates comprise a physical attributes device template that defines physical attributes of the first physical device and instructions for controlling the first physical device, a notification template that defines entities to notify when specified conditions are satisfied, and a role template that defines entities that have access to the first physical device.

12. The non-transitory computer readable storage medium of claim 8, wherein the first physical device has physical device attributes, and wherein the first virtual device comprises a superset of device attributes comprising the physical device attributes of the first physical device and logical device attributes provided for the first physical device by the second virtual device.

13. The non-transitory computer readable storage medium of claim 8, wherein the first physical device is deployed to a customer location prior to the change to the first device template, and wherein the first virtual device controls the first physical device prior to creation of the second virtual device, the operations further comprising:

terminating the first virtual device.

14. The non-transitory computer readable storage medium of claim 8, the operations further comprising:

creating the second virtual device responsive to determining that firmware of the first physical device has been updated, the firmware comprising the new device characteristic.

15. The non-transitory computer readable storage medium of claim 8, wherein reformatting the one or more commands comprises translating the one or more commands into new commands that are operable for the first physical device.

16. A computing device comprising:

a memory; and a processing device, connected with the memory, the processing device to:

determine a first plurality of device templates associated with a first physical device, wherein each of the first plurality of device templates defines one or more device attributes;

create a first virtual device from the first plurality of device templates, wherein the first virtual device inherits the one or more device attributes from the first plurality of device templates;

establish a connection between the first virtual device and the first physical device over a network;

receive, at the virtual device, one or more commands to perform an action from a remote computing device distinct from the computing device, the one or more commands initially having a first format;

reformat, at the virtual device, the one or more commands into a second format associated with the first physical device;

send the one or more commands to perform the action from the first virtual device to the first physical device via the connection, wherein the one or more commands are sent to the first physical device in the second format; and receive, at the first virtual device, one or more status updates from the first physical device via the connection.

17. The computing device of claim 16, wherein the first physical device comprises physical device attributes, and wherein the first virtual device comprises a superset of device attributes comprising the physical device attributes of the first physical device and logical device attributes provided for the first physical device by the first virtual device.

18. The computing device of claim 16, wherein after the first physical device is deployed to a customer location, the processing device further to:

determine a second plurality of device templates associated with the first physical device, wherein at least one of the second plurality of device templates defines a new device characteristic;

create a second virtual device from the second plurality of device templates, wherein the second virtual device inherits the new device characteristic;

establish a new connection between the first physical device and the second virtual device; and control the first physical device using the second virtual device.

19. The computing device of claim 16, the processing device further to:

determine a second plurality of device templates associated with a second physical device, wherein the second plurality of device templates comprises at least one common device template with the first plurality of device templates;

create a second virtual device from the second plurality of device templates;

establish a new connection between the second physical device and the second virtual device; and control the second physical device using the second virtual device.

20. The computing device of claim 16, wherein reformatting the one or more commands comprises translating the one or more commands into new commands that are operable for the first physical device.

* * * * *